No. 700,609. Patented May 20, 1902.
F. B. BEHR.
ELECTRICALLY PROPELLED VEHICLE FOR SINGLE RAIL ELEVATED RAILWAYS.
(Application filed Feb. 24, 1902.)
(No Model.) 6 Sheets—Sheet 1.
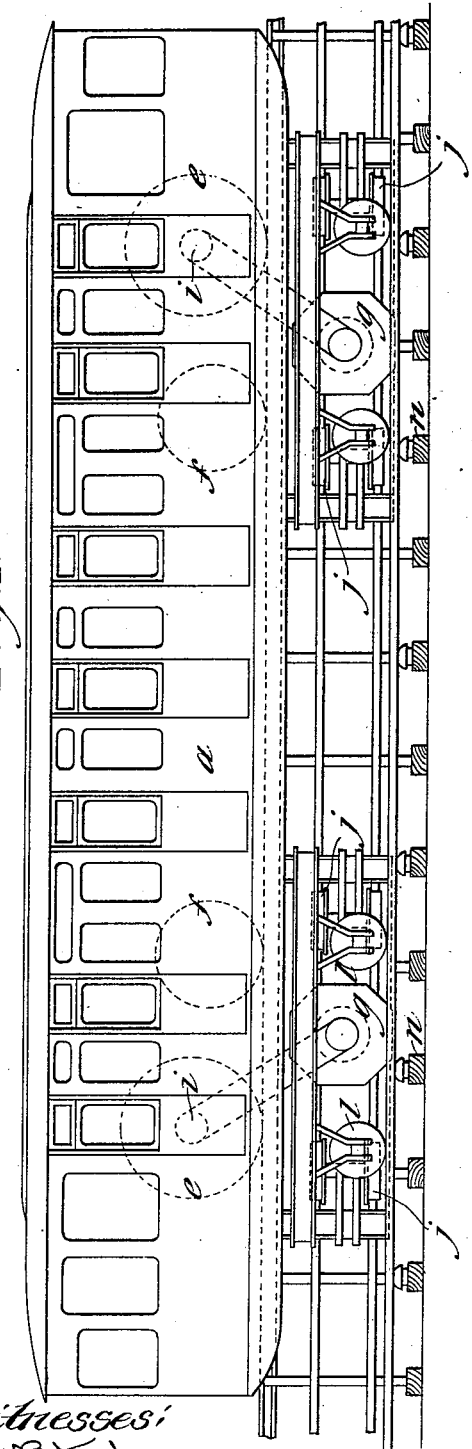
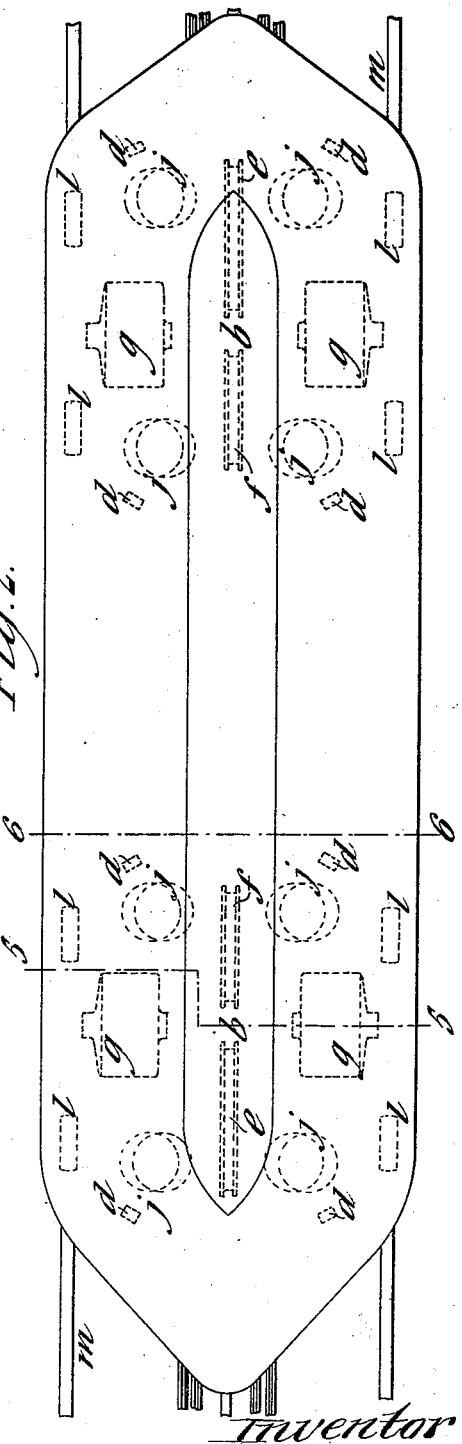
Witnesses:
Inventor
Fritz B. Behr
By James L. Norris
Atty No. 700,609. Patented May 20, 1902.
F. B. BEHR.
ELECTRICALLY PROPELLED VEHICLE FOR SINGLE RAIL ELEVATED RAILWAYS.
(Application filed Feb. 24, 1902.)
(No Model.) 6 Sheets—Sheet 2.
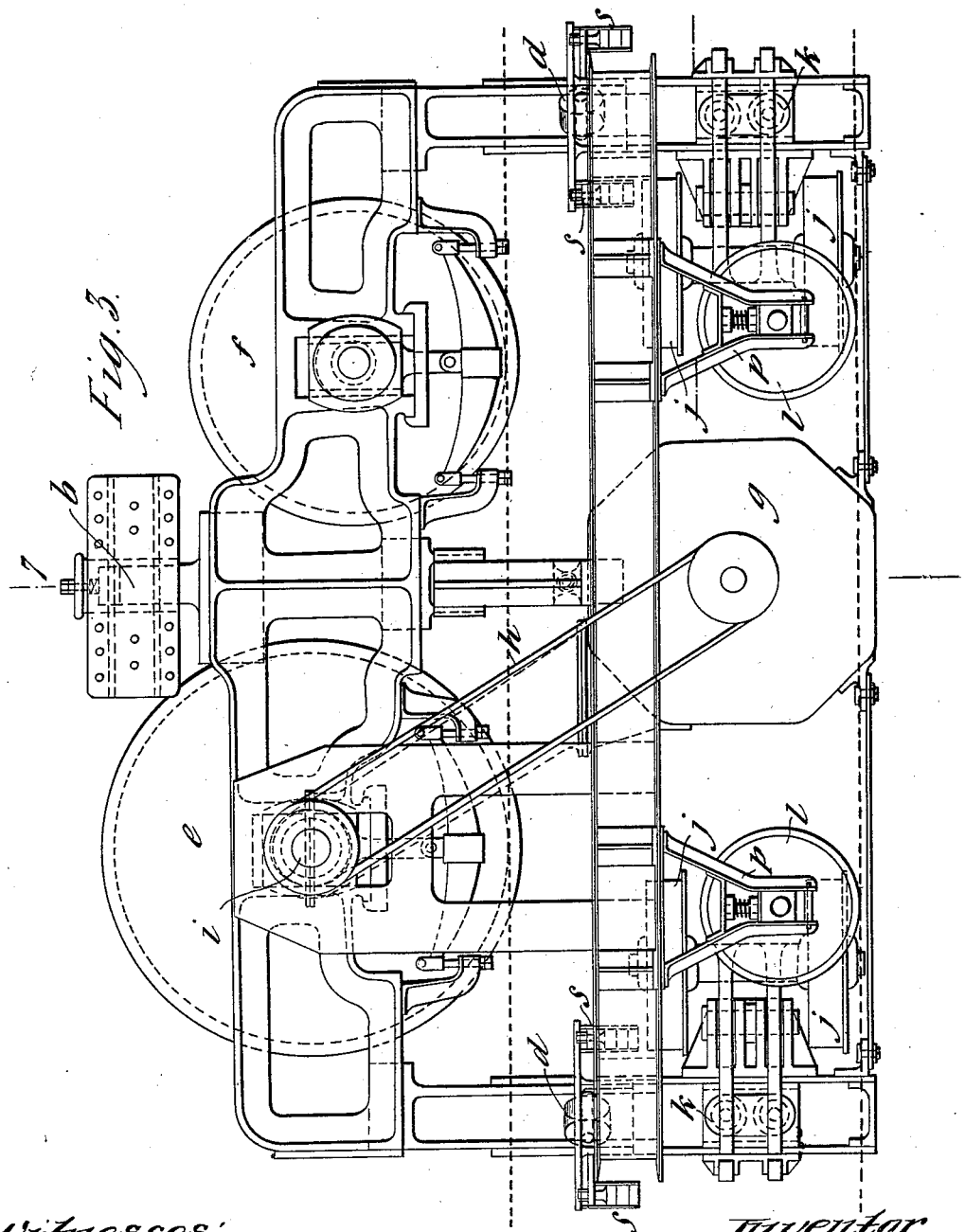
Witnesses:
Inventor
Fritz B. Behr
By
James L. Norris.
Atty

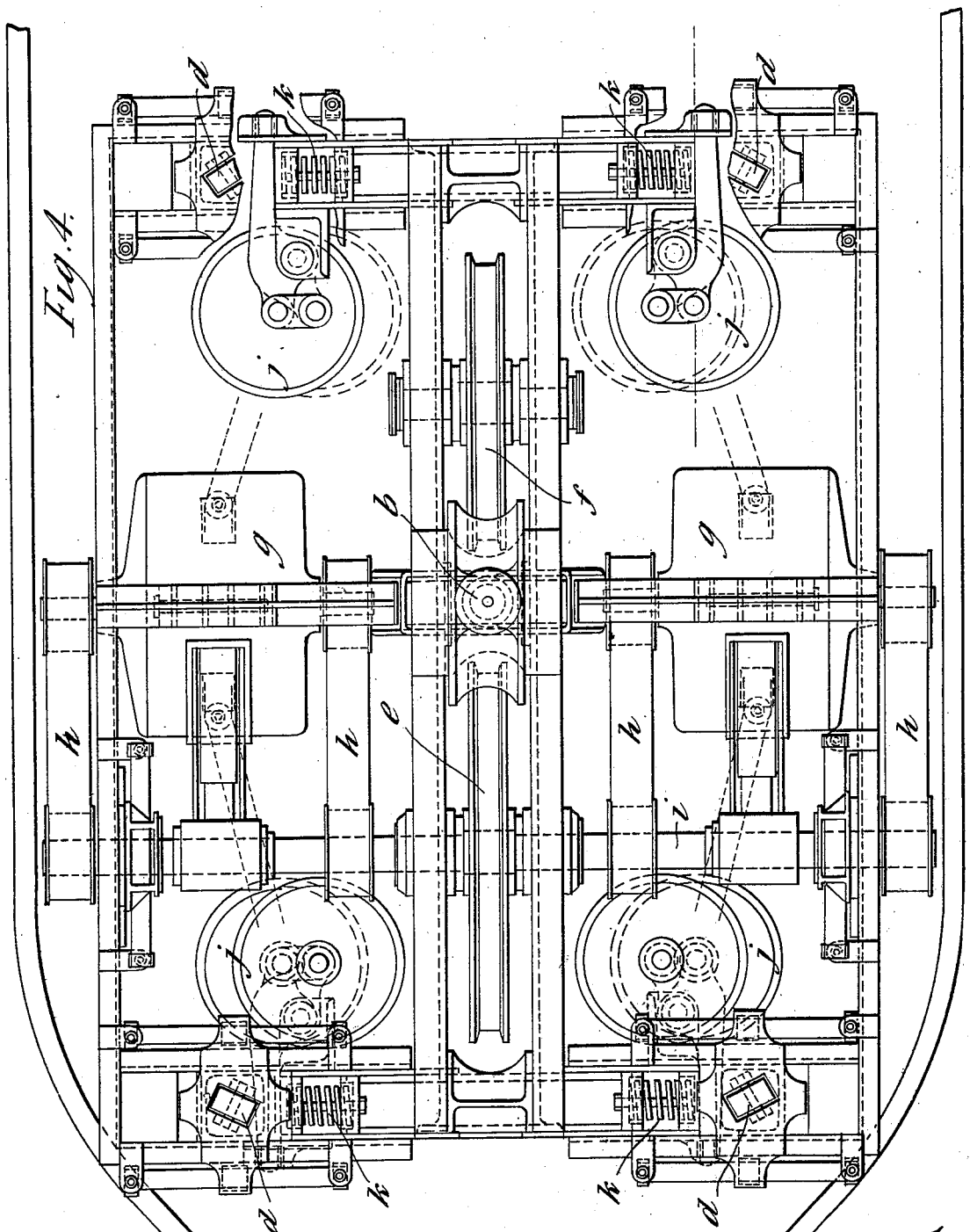

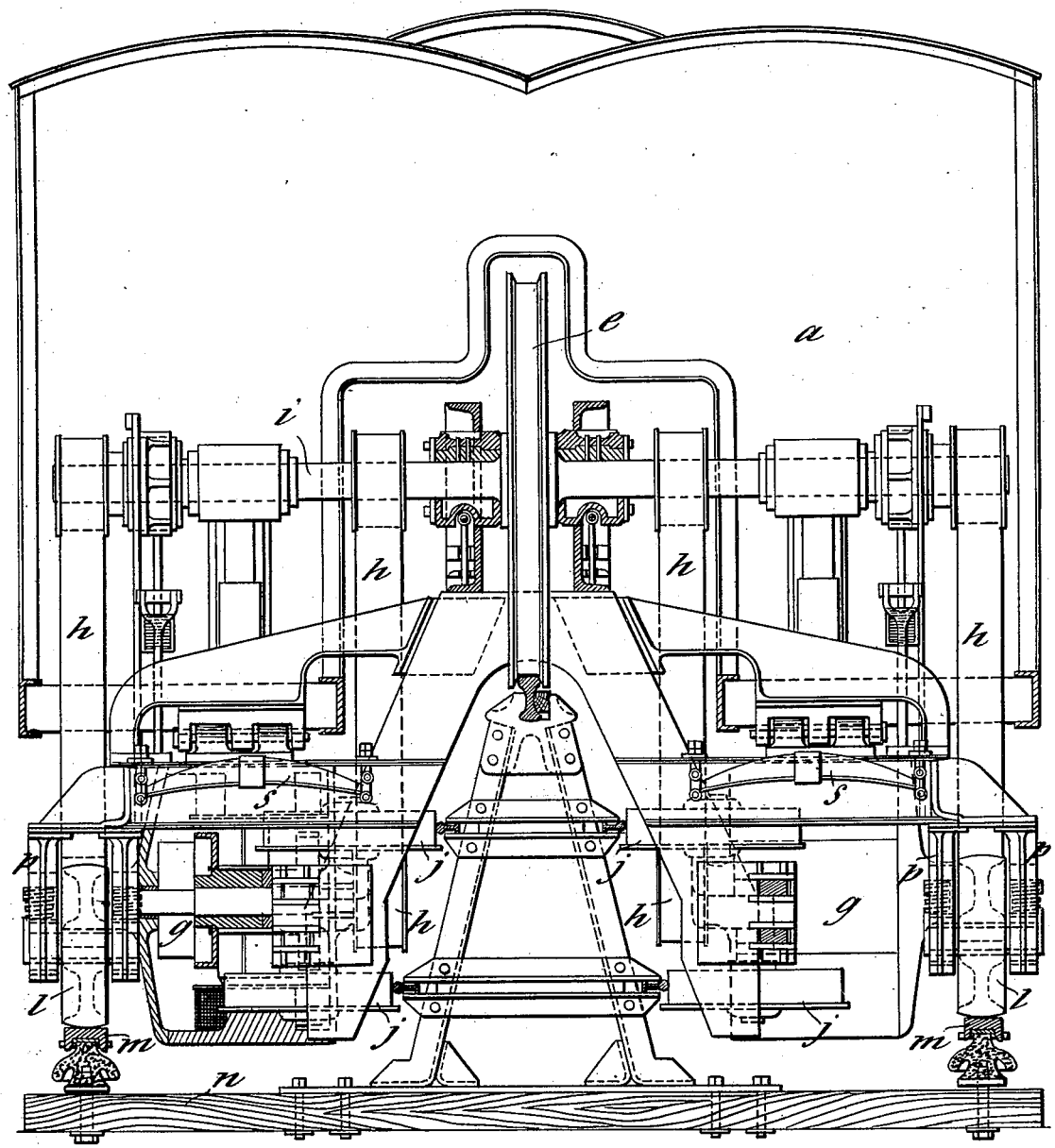

No. 700,609. Patented May 20, 1902.
F. B. BEHR.
ELECTRICALLY PROPELLED VEHICLE FOR SINGLE RAIL ELEVATED RAILWAYS.
(Application filed Feb. 24, 1902.)
(No Model.) 6 Sheets—Sheet 5.

No. 700,609. Patented May 20, 1902.
F. B. BEHR.
ELECTRICALLY PROPELLED VEHICLE FOR SINGLE RAIL ELEVATED RAILWAYS.
(Application filed Feb. 24, 1902.)
(No Model.) 6 Sheets—Sheet 6.

Witnesses:

Inventor
Fritz B. Behr
By
James L. Norris.
Atty

United States Patent Office.

FRITZ B. BEHR, OF TWICKENHAM, ENGLAND.

ELECTRICALLY-PROPELLED VEHICLE FOR SINGLE-RAIL ELEVATED RAILWAYS.

SPECIFICATION forming part of Letters Patent No. 700,609, dated May 20, 1902.

Application filed February 24, 1902. Serial No. 95,408. (No model.)

*To all whom it may concern:*

Be it known that I, FRITZ BERNHARD BEHR, a citizen of England, residing at South End House, Twickenham, in the county of Middlesex, England, have invented a certain new and useful Improvement in Electrically-Propelled Vehicles for Single-Rail Elevated Railways, of which the following is a specification.

My invention relates to electrically-propelled vehicles for single-rail elevated railways, so constructed that the passenger accommodation is free from side to side, that the vehicle can easily travel along curves of comparatively small radius, and that the heavy parts, including the electric motors, are arranged at a low level, giving great stability, as I shall describe with reference to the accompanying drawings, in the several figures of which the same letters are employed to denote the same parts.

Figure 6:
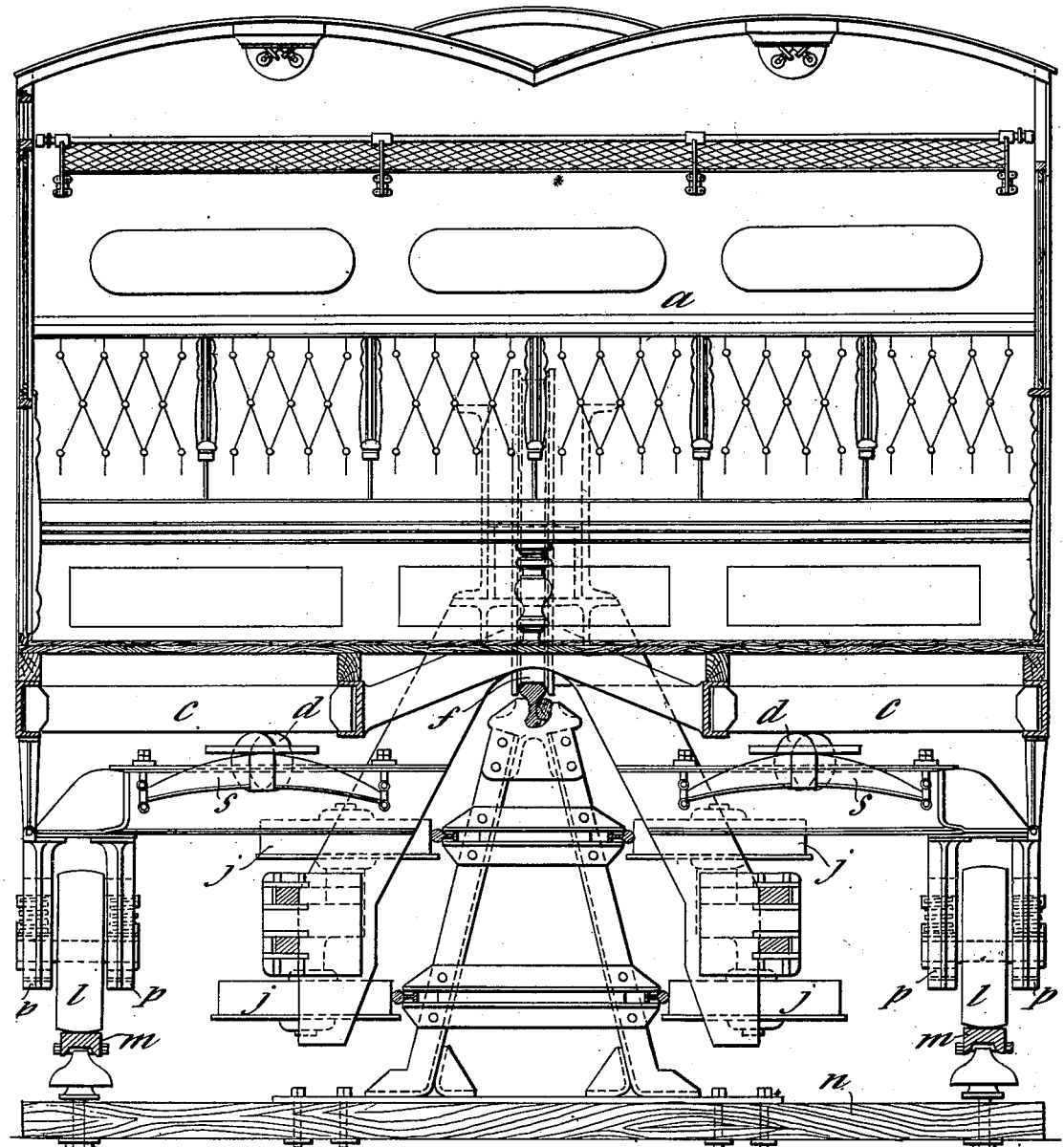
Figure 7:
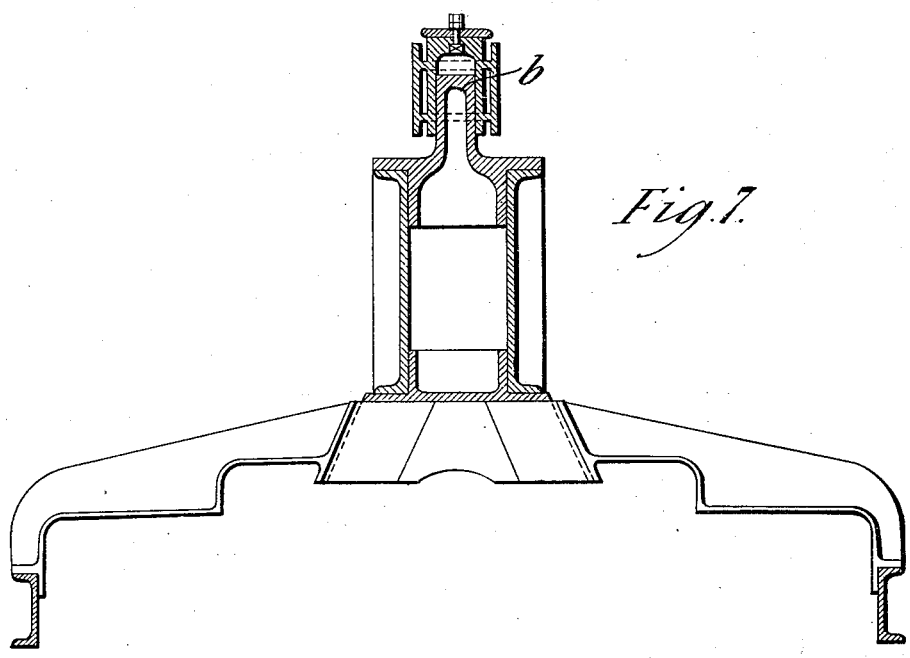

Figure 1 is a side elevation, and Fig. 2 is a plan, of a vehicle according to my invention. Fig. 3 is a side elevation with the side of the vehicle removed, and Fig. 4 is a plan with the floor removed of one of two bogies on which the motors and driving mechanism are mounted. Figs. 5 and 6 are transverse sections, respectively, on the lines 5 5 and 6 6 of Fig. 2; and Fig. 7 is a transverse section of the upper part of the vehicle on the line 7 7 of Fig. 3.

$a$ is the body of the vehicle, which is arranged to accommodate passengers with free passage from side to side. It is pivoted at two points on journals $b$, projecting up from two bogies which carry the motors, the propelling mechanism, and the guide and conducting wheels. The body has under its floor eight bearing-pieces $c$, which rest on eight rollers $d$, placed at an angle and mounted on springs $s$ on the bogie-frames. Thus the two bogies, each of which carries a driving-wheel $e$ and a trailing wheel $f$, can turn a little horizontally under the body on the pivots $b$, allowing these wheels to run freely on curved parts of the track. Each of the two bogies carries two electric motors $g$, one on each side.

On each of their shafts are two sprocket-wheels connected by flat chains $h$ with wheels on the shaft $i$ of the driving-wheel $e$, each of the two driving-wheels being thus driven by four chains from the shafts of the two motors of each bogie. On each bogie are also mounted the eight horizontal wheels $j$, which run on the lateral guide-rails, the vertical axles of these wheels being pressed against the rails by springs $k$. There are also mounted on each bogie four conducting-wheels $l$, two on each side, running on conducting-rails $m$, which are mounted on insulators fixed on sleepers $n$. The axle-boxes of the wheels $l$ slide in horn-plates $p$, in which they are pressed down by helical springs.

Although I have shown and described a number of driving, lateral guiding, and conducting wheels suited for a vehicle of the dimensions shown, obviously the number of these wheels might be varied to suit vehicles of different dimensions, maintaining, nevertheless, the general construction and relative arrangement of the body and the bogies as described and illustrated.

Having thus described the nature of this invention and the best means I know of carrying the same into practical effect, I claim—

An electrically-propelled vehicle for a single-rail elevated railway, comprising a body for accommodation of passengers, pivoted and mounted on spring-urged angle-rollers on bogies, which carry in the middle driving-wheels and at the sides electric motors connected by chain gear to the driving-wheels which also carry at the side spring-urged lateral guide-wheels and conducting-wheels pressed by springs on a conducting-rail mounted on insulators, substantially as described.

In testimony whereof I have hereunto set my hand in presence of two subscribing witnesses.

F. B. BEHR.

Witnesses:
 DAVID WILLIAMS,
 WALTER E. ROCHE.